Sept. 18, 1951 — D. McDONALD — 2,568,244
PNEUMATIC DEBAGGING MACHINE
Filed April 18, 1947 — 2 Sheets-Sheet 1

Sept. 18, 1951  D. McDONALD  2,568,244
PNEUMATIC DEBAGGING MACHINE
Filed April 18, 1947  2 Sheets-Sheet 2
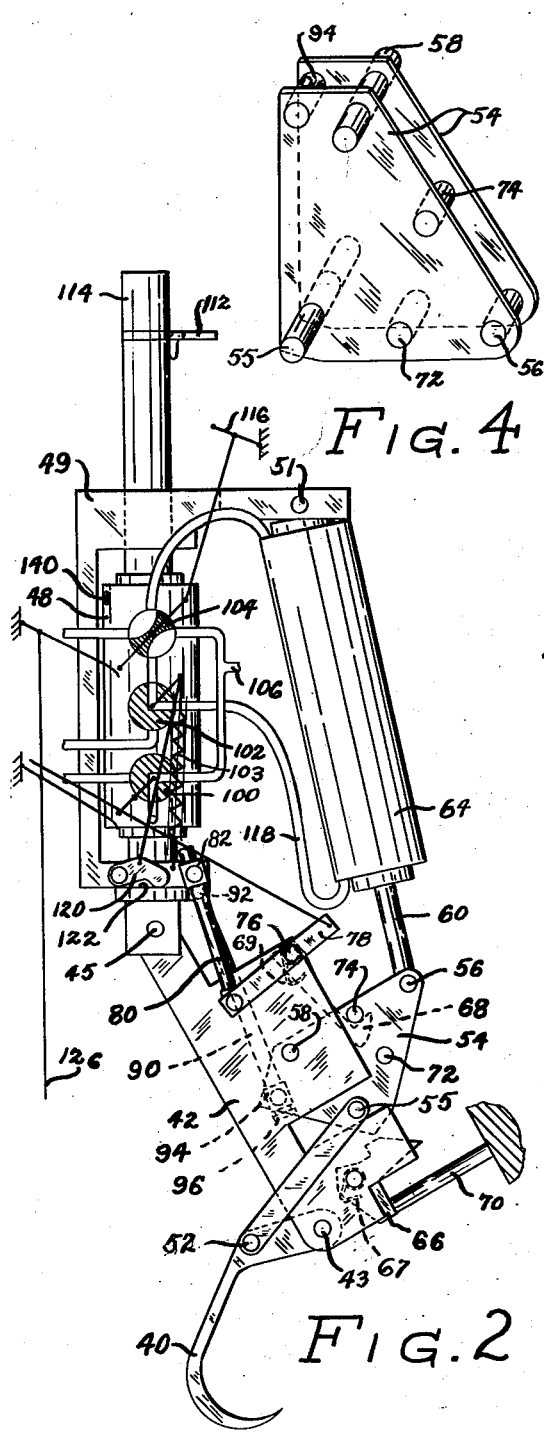
Fig. 2
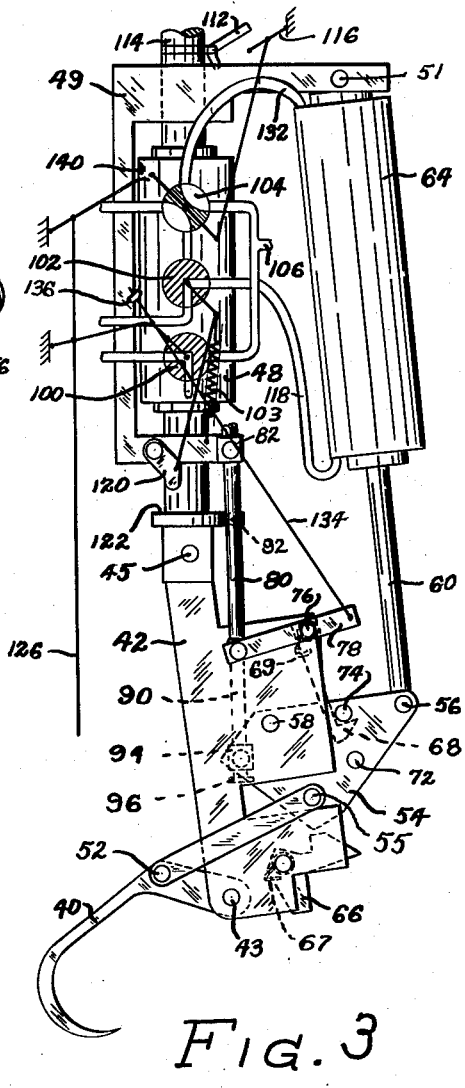
Fig. 4
Fig. 3
Donald McDonald, INVENTOR.
BY Dybvig & Dybvig,
His Attorneys.

Patented Sept. 18, 1951

2,568,244

UNITED STATES PATENT OFFICE 2,568,244

PNEUMATIC DEBAGGING MACHINE

Donald McDonald, Dayton, Ohio, assignor of one-half to Paul Frobe, Cincinnati, Ohio Application April 18, 1947, Serial No. 742,479

12 Claims. (Cl. 18—2)

This invention relates to an automatic debagging machine for use in the manufacture of tires. It is an object of this invention to provide a fully automatic debagging machine which is inexpensive and reliable in operation.

During the process of manufacturing automobile tires, it is standard practice to provide an element commonly referred to as a bag which is placed within the tire casing during the molding operation and is thereafter removed from the tire casing for reuse. Considerable force is required in removing the bag from the tire casing after the molding operation. It is an object of this invention to provide a pneumatically operated power unit for automatically removing the bag from the tire casing.

It is a further object of this invention to provide a simple arrangement for manipulating the bag engaging hook into and out of bag engaging position.

Further objects and advantages of the present invention reside in the construction and combination of parts and in the mode of operation as will be apparent from the following description, reference being had to the accompanying drawings wherein a preferred form of the present invention is clearly shown.

In the drawings:

Figure 2 is an elevational view of the debagging machine showing the arrangement of the parts upon completion of the bag removing operation;

Figure 3 is an elevational view of the debagging machine showing the arrangement of the parts in the early part of the debagging cycle just after the hook has started to move toward bag engaging position;

Figure 4 is a perspective view of the hook manipulating member; and

Figure 5 is a sectional view taken substantially on line 5—5 of Figure 1.

Figure 1:
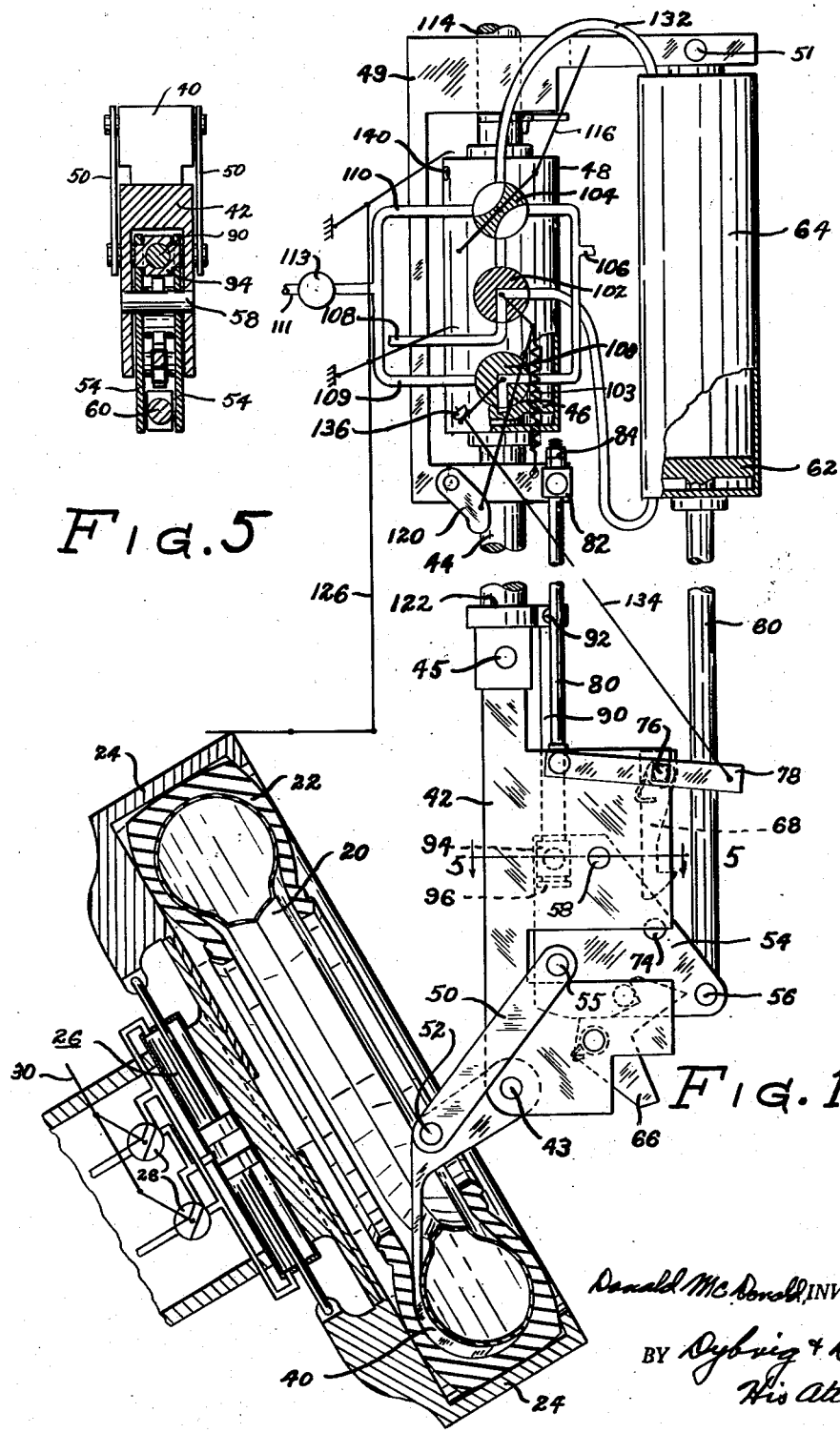
Figure 1 shows the debagging machine in elevation and shows the tire, bag and associated parts in section. The control valves and the control valve operating mechanism are schematically shown in this figure.

The debagging machine comprises a pair of pneumatically operated pistons one of which primarily serves the purpose of operating the hook for removing the bag from the tire and the other of which serves to manipulate the hook into and out of bag engaging position.

Referring now to the drawings wherein a preferred embodiment of my invention is shown, reference numeral 20 designates the bag which is used in molding the tire designated by the reference numeral 22. The tire is held in place by means of movable jaw elements 24 while the bag is removed from the casing 22. The movable jaws 24 are operated by means of pneumatic means generally designated by the reference numeral 26. The pneumatic means 26 as well as the jaw elements 24 have been shown somewhat schematically as the specific construction of these elements does not form a part of my invention. The operation of the jaws 24 is controlled by the valve means designated by the reference numeral 28. A common operator 30 is provided for operating the valve means 28.

The debagging machine comprises a bag engaging hook 40 which is pivotally carried by hook supporting element 42 which in turn is pivotally supported on the reciprocating piston rod element 44. Thus the hook 40 is rotatably mounted on the pivoted pin 43 carried by the element 42 and the element 42 is rotatably mounted on the pivoted pin 45 carried by the element 44. The hook supporting element 42 may be pulled upwardly by means of the pneumatically operated piston 46 mounted for reciprocation within the piston cylinder 48. The cylinder 48 is carried by the stationary support 49. The bag engaging hook 40 is moved into and out of bag engaging position by means of a pair of links 50 which have their one end pivotally connected to the hook 40 at 52 and have their other end pivotally connected to the hook operating member 54 at 55. The hook operating member is in turn pivotally supported from the hook supporting element 42 at 58. The hook operating member 54 is manipulated by the piston rod 60 connected to the piston 62 (see Figure 1) operating within the cylinder 64 which is pivotally carried by the support 49 at 51. A pair of spring biased latch elements 66 and 68 are provided for latching the hook operating member 54 in the position in which it is shown in Figure 1 or in the position in which it is shown in Figure 2.

The latch 66 normally holds the hook 40 and the hook operating member 54 in the relative position shown in Figure 1 during the debagging operation, but after the bag 20 has been removed from the casing 22 and the member 54 moves into the position in which it is shown in Figure 2, the latch 66 will strike the stationary stop 70 which causes the latch 66 to disengage from the pin 72 provided on the hook operating member 54. When the latch 66 releases the pin 72, the hook operating member 54 and the hook 40 are free to move into the relative position shown in Figure 2, but in this position the latch 68 will have engaged the pin 74 so as to hold the hook and hook operating member 54 in the relative position in which they are shown in Figure 2 until the pistons 46 and 62 begin moving the hook back into bag engaging position as will be explained more fully herinafter. The latch 68 remains in engagement with the pin 74 until the pistons 46 and 62 have been returned substantially to the original position shown in Figure 1 in which position the operating mechanism for the latch 68 will have automatically released the latch 68.

The latch 68 is non-rotatably secured to the pin 76 which is pivotally supported on the hook supporting element 42 as shown in the drawing. The pin 76 is operated by means of the lever 78 secured to the pin 76. The one end of the lever 78 is pivotally connected to the latch operating member 80 supported in the swivel block 82 which is pivotally mounted on the stationary frame 49. The free end of the latch operating member 80 is provided with stop means 84 which are instrumental in moving the latch 68 out of latching position as the hook support approaches its lowermost position. The latch elements 66 and 68 are both spring loaded into latching position by means of conventional torsion springs 67 and 69 respectively. The relative movement between the hook supporting element 42 and the hook operating member 54 is further controlled by the lever 90 which has its one end pivotally fixed to the piston element 44 at 92 and has its other end slidingly mounted in the swivel element 94 pivotally supported between the spaced plates forming the hook operating member 54. A stop 96 is provided on the end of the member 80 so as to force the hook operating member 54 to return to the position in which it is shown in Figure 1 as the piston 62 is forced to the lower end of the cylinder 64. As the piston 62 moves down, the hook supporting element 42 swings about the pivot 45 into the straight down position and as this takes place the distance between the pivot 92 and the swivel element 94 increases until the element 94 strikes the stop 96 and thus forces the member 54 to move into the position in which it is shown in Figure 1.

The operations of the pistons 46 and 62 are controlled by the valves 100, 102 and 104. Compressed air for operating the device is supplied to the valves 100 and 104 through the supply line 106. In order not to needlessly complicate the disclosure by showing details of construction which any mechanic could supply, the valve operating linkage mechanism has been shown schematically.

Referring now to Figure 1 of the drawings, wherein I have shown the apparatus in a position ready to remove the bag from the mold, it will be observed that the valve 100 is arranged in a position allowing air to flow from the source 106 into the lower end of the cylinder 48 so as to cause the piston 46 to be lifted which in turn causes the hook 40 to lift the bag out of the mold. It will also be noted that the valves 102 and 104 are then adjusted so as to connect both ends of the cylinder 64 to the air outlets 108 and 110 which communicate with the outside atmosphere with the result that the piston 62 is free to move in the cylinder 64 as the piston 46 is pulling the debagging hook upwardly. There are two operators for the valve 104. Thus a linkage mechanism 126 shifts the valve 104 from a first position in which it is shown in Figures 1 and 2 to a second position in which it is shown in Figure 3 in response to the tire holding jaws 24 moving into the gripping position, as will be explained more fully hereinafter. The valve is returned to the first position by the operator 112 in response to upward movement of the piston extension 114. Figure 2 shows the debagging machine upon completion of the bag removing operation and prior to the reclosing of the tire compress jaws 24. Upon closing of the compress jaws 24, the linkage mechanism 126 will reset the valve 104 to the position in which it is shown in Figure 3. This causes compressed air to flow from the source 106 into the upper end of the cylinder 64 so as to move the piston 62 and piston rod 60 downwardly. The latch 68 prevents relative rotation between the member 54 and the support 42 during the initial downward movement of the support 42. Shortly before the piston rod 60 approaches its extreme lowermost position, the valve operating rod 134 will shift the valve 100 into the position in which compressed air is fed into the lower end of the cylinder 48. The latch 68 then disengages the pin 74 so as to allow the member 54 to rotate on the hook supporting element 42 in response to continued downward movement of the piston 62 and piston rod 60. The air flowing into the lower end of the cylinder 48 causes the piston 46 to begin moving upwardly before the piston rod 60 has moved all the way to its lowermost position. This upward movement of the piston 46 and extension 114 will cause the valve 104 to shut off the supply of air to the upper end of the cylinder 64. As the piston 46 moves towards its upper position, the valve operating member 112 carried by the extension 114 provided on the upper end of the piston 46 will engage the valve operating linkage 116 and cause said linkage to move the valve 104 into the position in which it is shown in Figures 1 and 2. With the valves 102 and 104 arranged in the position in which they are shown in Figure 2, compressed air from the supply line 106 is free to flow through the valve 104 to the valve 102 which directs the air into the flexible line 118 leading to the lower end of the cylinder 64 with the result that the piston 62 will exert an upward pull on the hook operating member 54 so as to not only cause the member 42 to swing about the pivot 45 and into the position in which it is shown in Figure 2 but also to cause the member 54 to manipulate the tire debagging hook into the bag releasing position in which it is shown in Figure 2.

The valve 102 includes biasing means 103 for biasing it into the position in which it is shown in Figures 1 and 3 and consequently remains in the position in which it is shown in Figure 1 until the piston rod 44 nears the end of its upward movement at which time the valve operating member 120 will be engaged by the flange 122 provided adjacent the lower end of the piston rod 44. The member 120 then shifts the valve 102 into the position in which it is shown in Figure 2. The debagging apparatus will remain in the position in which it is shown in Figure 2 until the next tire has been vulcanized and it is desired to remove the bag therefrom, at which time, the valves 28 will be operated by means of the manual operator 30 so as to shift the tire engaging jaws 24. Upon shifting of the jaws 24, the valve operating linkage mechanism 126 will be moved from the position in which it is shown in Figure 2 to the position in which it is shown in Figure 3. For purposes of illustration, the mechanism 126 has been shown as operated by the jaws 24 whereas it could be operated in response to movement of the valve means 28 or the operator 30.

The above described movement of the linkage mechanism 126 moves the valves 100 and 104 from the position in which they are shown in Figures 1 and 2 to the position in which they are shown in Figure 3 with the result that air under pressure from the source 106 is directed through the valve 104 to the flexible connection 132 leading from the valve 104 to the upper end of the cylinder 64 and air in the lower end of cylinder 48 escapes through the vent pipe 109. The air pressure in the upper end of cylinder 64 then causes the piston 62 to move downwardly and carry with it the hook supporting element 42 together with the parts carried thereby. As the hook supporting element 42 begins to move downwardly, the valve operating element 120 allows the valve 102 to return to the position in which it is shown in Figure 3 whereby air in the lower end of the cylinder 64 is allowed to escape to the outside atmosphere through the valve 102 and the vent outlet 108. During the downward or return stroke, the latch 68 prevents the hook operating member 54 from returning the hook into bag engaging position until the mechanism nears its lowermost position at which time the stop 84 provided on the rod 80 will engage the swivel element 82 and exert a pull on the lever 78 so as to release the latch 68 from the pin 74 and allow the hook operating member 54 to move the hook into bag engaging position. A predetermined time interval after the stop 84 engages the swivel 82, the continued pivotal movement of the lever 78 will cause the stop 136 on the upper end of the valve operating rod 134 to move the valve 100 from the position in which it is shown in Figure 3 to the position in which it is shown in Figure 1 whereby air under pressure will again be supplied to the lower end of the cylinder 48 so as to automatically cause the apparatus to start out a new debagging cycle which is fully automatic until the bag has been removed from the mold and the hook moved out of bag engaging position. The relationship between the rod 134, the stop 136, and the valve 100 is such that upward movement of the rod 134 does not operate the valve 100 and the initial downward movement of the rod 134 is inoperative to operate the valve 100 but towards the end the downward movement of the rod 134, the stop 136 will pick up the operator for the valve 100. A vent 140 which is always open is provided at the upper end of the cylinder 48 whereby the piston 46 is free to move upwardly at all times. It will be noted that the valve operating member 112 carried by the extension 114 is constructed and arranged to be ineffective to operate the valve operating linkage 116 as the extension 114 moves downwardly but will operate the linkage mechanism 116 as the operator 112 moves upwardly past the linkage mechanism 116.

By virtue of the above described construction and operation, it is apparent that when the tire holding vise is moved into the position which it occupies during the debagging operation, the control valves 100 and 104 will be actuated by the linkage mechanism 126 to the position in which they are shown in Figure 1. As a consequence of this movement of the valves 100 and 104, the debagging hook will be automatically moved from the position in which it is shown in Figure 2 to the position in which it is shown in Figure 1, at which time the valve 100 will have been moved to the position in which it is shown in Figure 1 so as to automatically cause the hook 40 to remove the bag from the tire casing 20 and finally come to rest in the position in which it is shown in Figure 2 at the end of each debagging cycle.

The debagging cycle is fully automatic and begins with the apparatus from the position in which it is shown in Figure 2. The automatic operation is initiated when the linkage mechanism 126 moves upwardly so as to shift the valves 100 and 104 from the position in which they are shown in Figure 2 to the position in which they are shown in Figure 3.

Figure 3 shows the arrangement of the parts shortly after the beginning of the cycle whereas Figure 1 shows the arrangement of the parts just after the hook 40 has moved into bag engaging position and after the valve 100 has been shifted so as to initiate the return stroke or upward movement of the debagging hook 40. The debagging mechanism does not come to rest until the cycle has been completed at which time the parts occupy the position in which they are shown in Figure 2.

The construction and arrangement is such that the hook 40 moves into bag engaging position without the need for any guidance on the part of the operator. Furthermore, the path of movement of the outer end of the hook 40 is such that it is guided directly between the tire 22 and the bag 20 without danger of injury to either one.

As shown in Figure 1 of the drawing, the outlets 109 and 110 are connected to a common exhaust line 111 in which the valve 113 is located. By manually adjusting the valve 113, it is possible to regulate the rate at which the pressure is relieved from the cylinder 48 so as to cause the air pressure acting on the piston 46 to retard the downward movement of the piston 46 until the air pressure acting on the piston 62 will have moved the hook support 42 into alignment with the piston rod 44. The setting of the valve 113 will also affect the speed of operation to some extent.

While the form of embodiment of the invention as herein disclosed, constitutes a preferred form, it is to be understood that other forms might be adopted, all coming within the scope of the claims which follow.

Having thus described my invention, I claim:

1. In an automatic debagging machine, a bag engaging hook, a hook supporting member, pneumatic means including a piston and piston rod for raising said hook supporting member, means for pivotally mounting said hook supporting member on said piston rod, a hook operating member pivotally supported on said hook supporting member, linkage means connecting said hook and said hook operating member, and pneumatic means controlling the operation of said hook operating member to move said hook from a first position in which said hook is in bag engaging position to a second position in which said hook is held in bag releasing position.

2. In an automatic debagging machine, a bag engaging element, first pneumatic means for exerting a pull on said bag engaging element so as to remove a bag from a tire casing, a second pneumatic means for thereafter manipulating said bag engaging element so as to move said bag engaging element into a bag releasing position, means for automatically controlling the operation of said first and second pneumatic means including means for delaying the operation of said second pneumatic means until said bag has been removed from the tire casing.

3. In a machine for removing a tire molding bag from a tire casing, a bag engaging hook, a hook supporting element, pneumatic means including a piston and a position rod for reciprocating said hook supporting element, and automatic means including means carried by said hook supporting element for oscillating said hook supporting element relative to said piston rod so as to swing said hook into and out of alignment with the tire casing.

4. In a debagging machine, a bag engaging hook, a hook supporting element, automatic means for reciprocating said hook supporting element, and automatic means for oscillating said hook supporting element relative to said means for reciprocating said hook supporting element, said last named automatic means including means carried by said hook supporting element for oscillating said bag engaging hook relative to said hook supporting element.

5. In a debagging machine, a main frame, a bag engaging hook for removing a tire molding bag from a tire casing, a hook supporting element, first automatic means carried by said frame for actuating said hook supporting element, and second automatic means carried by said frame for oscilating said hook supporting element relative to said actuating means, said second automatic means including means for rotating said bag engaging hook relative to said hook supporting element after the bag has been removed from the tire casing.

6. In a tire debagging machine, a stationary support, a first cylinder means carried on said support, second cylinder means pivotally mounted on said support, piston means operatable within said first named cylinder, a debagging hook, supporting means for said hook pivotally connected to said first named piston means, hook manipulating means including a member pivotally supported on said hook supporting means, and means for pivotally connecting said hook manipulating member to said second named piston means.

7. In an automatic debagging machine, a bag engaging hook, a member for pivotally supporting said hook, means for raising and lowering said hook supporting member, means for imparting oscillatory movement to said hook relative to said hook supporting member whereby said hook is movable from a bag engaging position into a bag releasing position, first latch means for latching said hook manipulating member in bag engaging position, second latch means for latching said manipulating member out of bag engaging position, means for releasing said first named latch when said bag engaging hook approaches its upper position and means for releasing said second named latch when said bag engaging hook approaches its lowermost position whereby said hook is then free to swing into bag engaging position.

8. An automatic debagging machine comprising in combination, a bag engaging hook, a hook supporting element, first pneumatic means including a reciprocating piston means for reciprocating said hook supporting element, means for pivotally mounting said hook on said hook supporting element, second pneumatic means, means carried by said hook supporting element and operated by said second pneumatic means for rotating said hook relative to said supporting element, and valve means for controlling the operation of said first and second pneumatic means.

9. An automatic debagging machine comprising in combination, a bag engaging hook, a hook supporting element, first pneumatic means including a reciprocating piston means for reciprocating said hook supporting element, means for pivotally mounting said hook on said hook supporting element, second pneumatic means, means carried by said hook supporting element and operated by said second pneumatic means for rotating said hook relative to said supporting element, and valve means for controlling the operation of said first and second pneumatic means, said valve means comprising a first valve for regulating the flow of motivating fluid to said first pneumatic means, and second and third valves for controlling the operation of said second pneumatic means, said second valve serving to supply fluid for rotating said hook in the one direction and said third valve serving to supply fluid for rotating said hook in the opposite direction.

10. In a tire debagging machine, a stationary support, first cylinder carried by said support, second cylinder carried on said support, first piston means operable within said first cylinder, a bag engaging hook, supporting means for said hook pivotally connected to said first named piston means, hook manipulating means including a member pivotally supported on said hook supporting means, second piston means operable within said second named cylinder, and means for pivotally connecting said hook manipulating means to said second named piston means, first valve means for controlling the supply of motivating fluid to said first cylinder for moving said first cylinder means in the one direction, second valve means for controlling the flow of a motivating fluid to one side of said second piston means for moving said second piston means in the one direction, and third valve means for controlling the flow of a motivating fluid to the other end of said second named piston means.

11. In a tire debagging machine, a stationary support, first cylinder carried by said support, second cylinder carried on said support, first piston means operable within said first cylinder, a bag engaging hook, supporting means for said hook pivotally connected to said first named piston means, hook manipulating means including a member pivotally supported on said hook supporting means, second piston means operable within said second named cylinder, and means for pivotally connecting said hook manipulating means to said second named piston means, first valve means for controlling the supply of motivating fluid to said first cylinder for moving said first cylinder means in the one direction, second valve means for controlling the flow of a motivating fluid to one side of said second piston means for moving said second piston means in the one direction, and third valve means for controlling the flow of a motivating fluid to the other end of said second named piston means, a vise for holding a tire casing, and means operative in response to movement of said vise for actuating said first valve means.

12. An automatic debagging machine comprising in combination, a tire holding vise, a stationary support, a first cylinder secured to said support, a second cylinder pivotally mounted on said support, a first piston means operable within said first cylinder and including a piston rod, second piston means operable within said second cylinder and including a second piston rod, a bag engaging hook, a support for said hook pivotally connected to said first named piston rod, hook manipulating means pivotally carried by said hook support, linkage means connecting said hook and said hook manipulating means, said hook manipulating means having one portion thereof pivotally connected to said second named piston rod, a first latch means carried by said hook support for latching said hook manipulating means in a first position in which said hook is held in tire engaging position, a first means for limiting relative rotation between said hook manipulating means and said hook support comprising a rod having one end thereof fixed to the outer end of said first named piston rod and having its other end mounted for limited sliding movement relative to said manipulating means, a second latch for latching said manipulating means in a position thereof, means for operating said second valve in response to movement of said first piston means, said third valve comprising connections for supplying fluid under pressure to either end of said second cylinder, and means for operating said third valve comprising first means operable in response to movement of said vise and second means operable in response to movement of said first piston means.

DONALD McDONALD.

REFERENCES CITED

The following references are of record in the file of this patent:

UNITED STATES PATENTS

| Number | Name | Date |
|---|---|---|
| 1,535,382 | Taylor et al. | Apr. 28, 1925 |
| 1,563,513 | McNeill | Dec. 1, 1925 |
| 1,631,281 | Moore | June 7, 1927 |
| 2,244,162 | Leguillon | June 3, 1941 |
| 2,309,590 | Honderich | Jan. 26, 1943 |